United States Patent
Wilhite, Jr.

Patent Number: 5,322,250
Date of Patent: Jun. 21, 1994

[54] FOLDABLE SUPPORT LEG ASSEMBLY

[76] Inventor: William C. Wilhite, Jr., 1401 Erin, Apt. 115-4, Monroe, La. 71201

[21] Appl. No.: 39,738

[22] Filed: Mar. 30, 1993

[51] Int. Cl.$^5$ .............................................. F16M 13/00
[52] U.S. Cl. ................................. 248/166; 248/83; 248/431
[58] Field of Search ............... 248/166, 76, 81, 83, 248/431, 170, 168, 188.9, 520, 528, 529; 40/610, 612, 606, 607, 584

[56] References Cited

U.S. PATENT DOCUMENTS

| | | | |
|---|---|---|---|
| 1,213,409 | 1/1917 | Pfeifer | 248/166 |
| 1,670,029 | 5/1928 | Fetter | 248/431 X |
| 2,219,400 | 10/1940 | Ritzinger et al. | 248/83 |
| 2,596,302 | 5/1952 | Squyres | 248/164 X |
| 2,646,239 | 7/1953 | Young, Jr. | 248/166 |
| 2,673,636 | 3/1954 | Vermette | 248/168 |
| 2,681,030 | 6/1954 | Hoge | 248/166 |
| 2,706,610 | 4/1955 | Roberts | 248/168 |
| 2,939,360 | 6/1960 | Carten | 248/431 X |
| 3,572,622 | 3/1971 | Smith | 248/76 X |
| 4,169,571 | 10/1979 | Duggan | 248/166 X |
| 4,194,711 | 3/1980 | Winton | 248/83 X |
| 4,203,242 | 5/1980 | Griffin | 248/168 X |
| 4,403,758 | 9/1983 | Burt | 248/83 X |
| 4,406,434 | 9/1983 | Schneckloth | 248/83 |
| 4,715,570 | 12/1987 | Mashuda | 248/83 |
| 4,722,500 | 2/1988 | Bray | 248/83 X |
| 4,905,391 | 3/1990 | Dillon | 248/168 X |
| 5,033,702 | 7/1991 | Robbins | 248/83 |

FOREIGN PATENT DOCUMENTS

| | | | |
|---|---|---|---|
| 822635 | 10/1959 | United Kingdom | 248/520 |
| 1548459 | 7/1979 | United Kingdom | 248/166 |

*Primary Examiner*—Karen J. Chotkowski
*Attorney, Agent, or Firm*—Brady, O'Boyle & Gates

[57] ABSTRACT

A foldable support leg assembly wherein a depending leg is pivotally connected to a pair of fixedly connected bent pair of legs positioned in back-to-back relationship to form a hyperbolic configuration having a pair of upwardly divergent arm portions and a pair of downwardly extending divergent leg portions. The depending leg is pivotal to a stored position into a plane coextensive with the leg portions, and pivotal outwardly to an erected position from the plane to an inclined position. The foldable leg assembly can be employed for supporting a recreational vehicle waste drain hose assembly or a traffic warning signal.

10 Claims, 3 Drawing Sheets

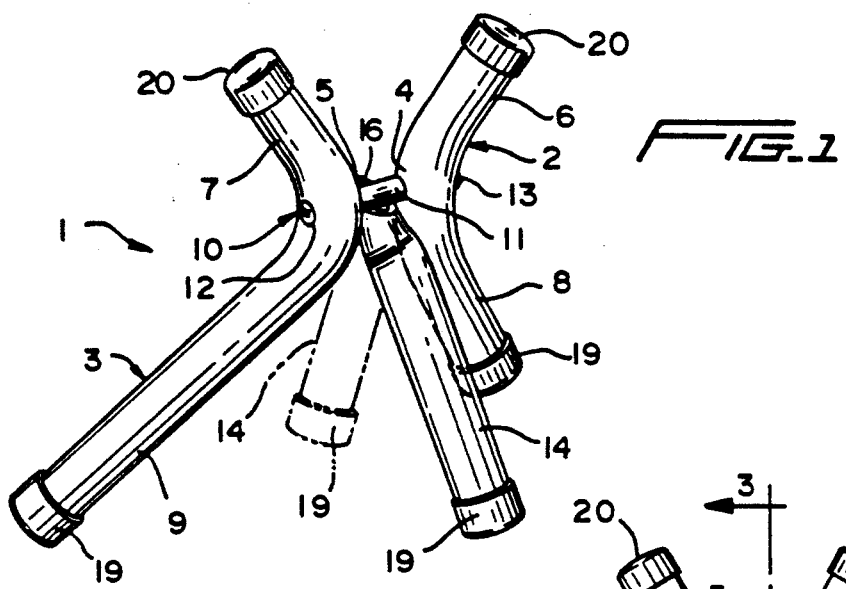
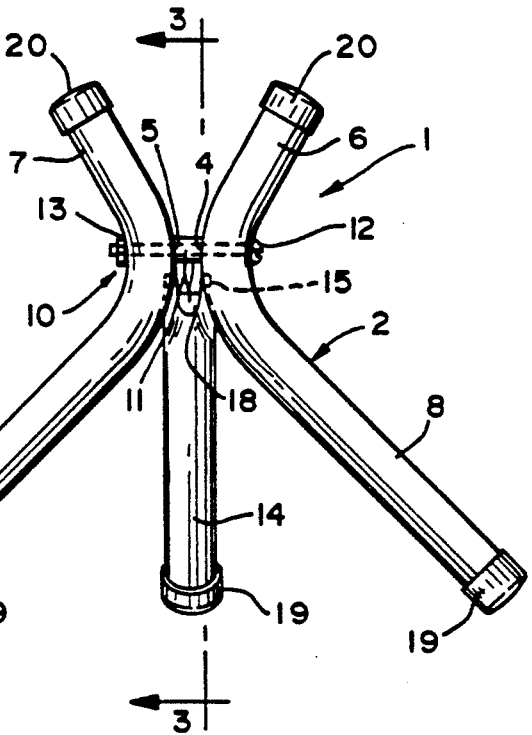
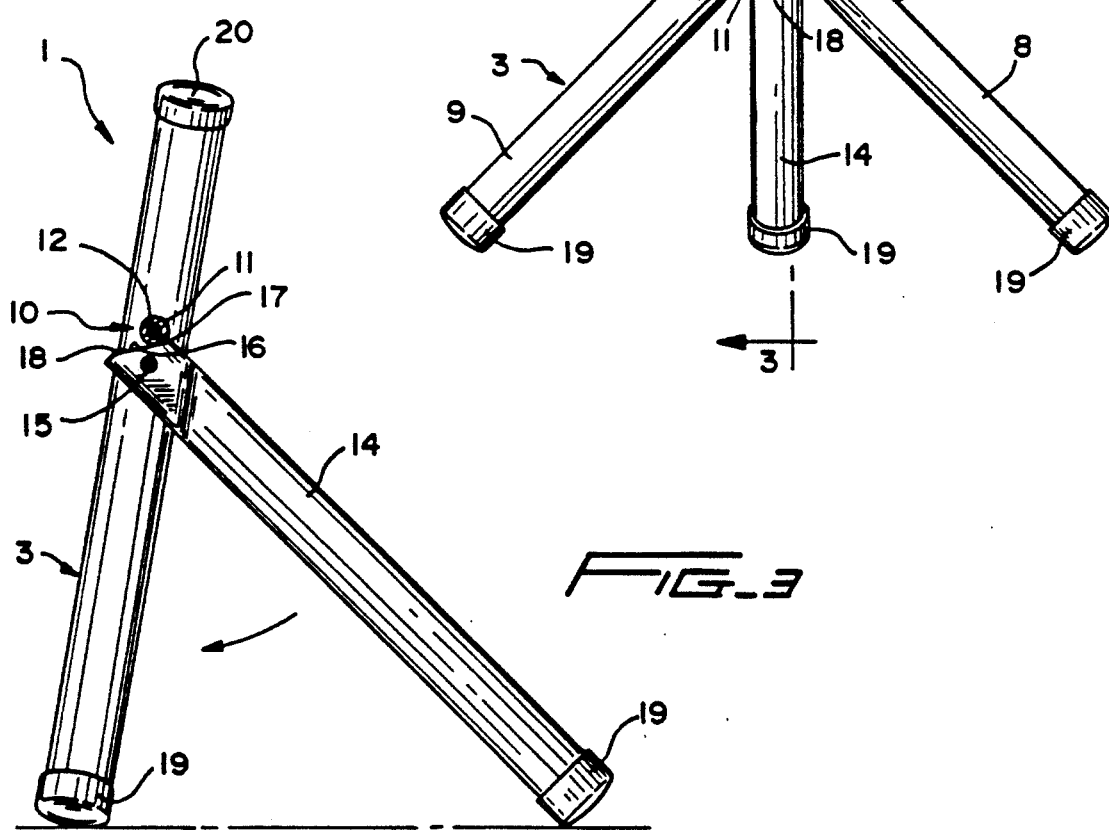

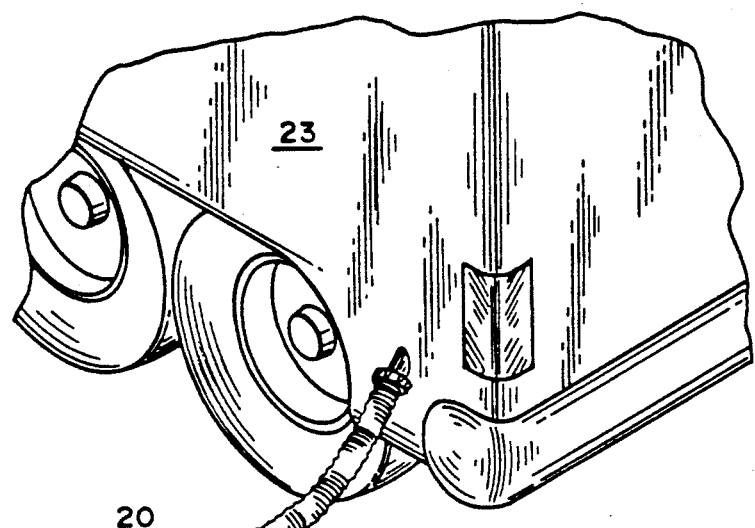
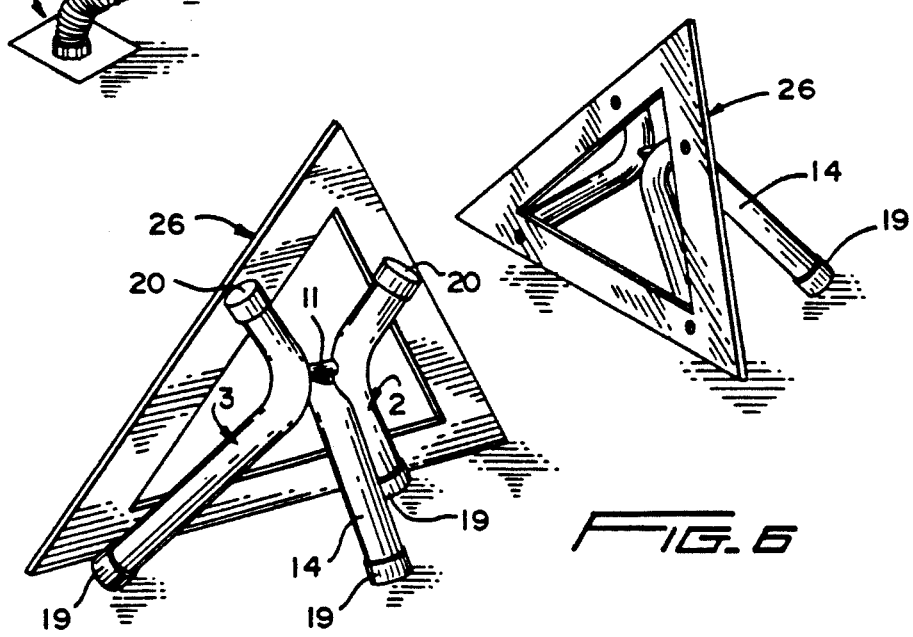

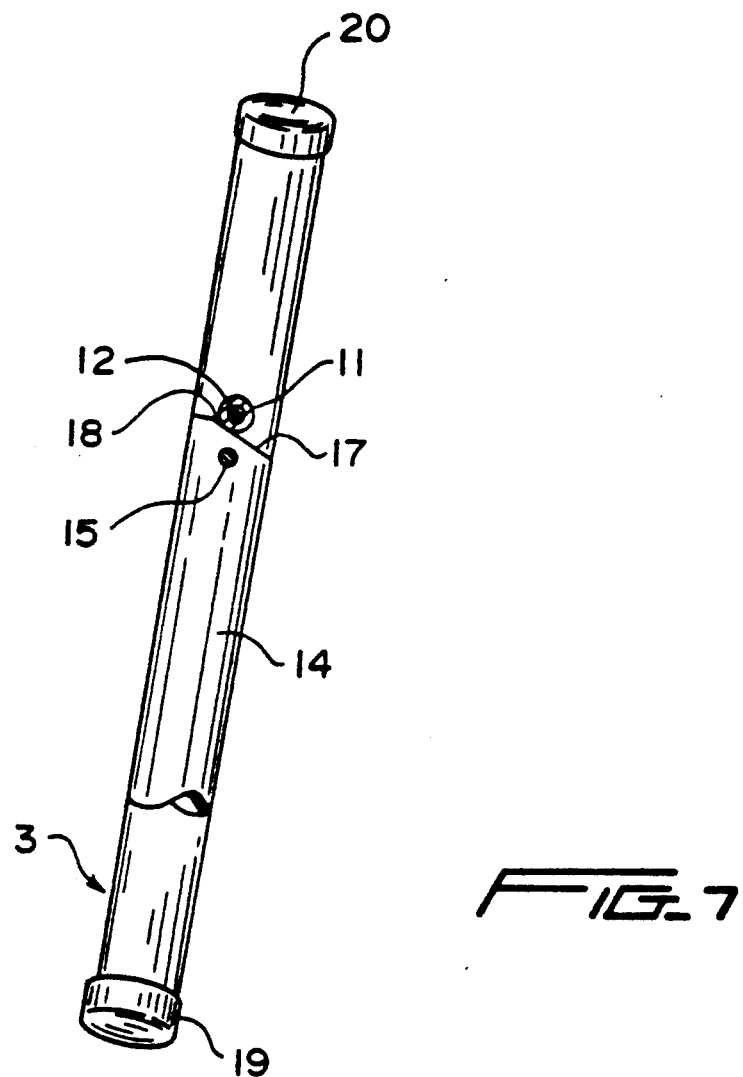

FOLDABLE SUPPORT LEG ASSEMBLY

BACKGROUND OF THE INVENTION

Various foldable support leg assemblies have been provided for supporting a flexible drain hose employed for conveying waste materials from a recreational vehicle to a waste or sewerage system at a trailer park. U.S. Pat. Nos. 3,572,622; 4,169,571: 4,715,570 and 4,722,500 disclose various drain hose support assemblies. While each of these assemblies have been satisfactory for their intended purpose, they have been characterized by a plurality of movable or foldable parts resulting in an assembly which is difficult to erect and to fold, too expensive to manufacture, and too bulky when folded to the storage position.

SUMMARY OF THE INVENTION

After considerable research and experimentation, the foldable leg assembly of the present invention has been devised which has only one part which can be manually pivoted to the erected position and folded to the stored position, whereby the assembly can be easily erected, and, when folded to the stored position, it occupies a minimal storage space. It is inexpensive to manufacture and is not likely to get out of order even after long and continued use.

The foldable support leg assembly of the present invention comprises, essentially, a pair of bent, plastic, tubular legs positioned in spaced, back-to-back relationship at their bent portions, to thereby form a hyperbolic configuration having a pair of upwardly extending divergent tubular arm portions and a pair of downwardly extending divergent leg portions. A fastener fixedly connects the tubular legs in spaced relationship at their bent portions, and a third depending leg portion is positioned in the space between the pair of downwardly extending divergent leg portions and pivotally connected to the divergent leg portions in proximity to the fastener, whereby the third leg can be pivoted from a stored position wherein the third leg is in the same plane containing the divergent legs, to an operative position outwardly therefrom, whereby the downwardly extending divergent leg portions and third leg support the assembly on the ground while the upwardly extending divergent tubular arm portions are constructed and arranged to selectively support a flexible drain hose or a traffic warning signal.

BRIEF DESCRIPTION OF THE DRAWINGS

FIG. 1 is a perspective view of the foldable support leg assembly of the present invention, showing, in dotted lines, the foldable leg pivoted to the stored position:

FIG. 2 is a front elevational view of the foldable support leg assembly in the erected position:

FIG. 3 is a view taken along line 3-3 of FIG. 2;

FIG. 4 is a perspective view showing a support leg assembly employed for supporting an inclined trough containing a flexible waste hose extending from a recreational vehicle to a waste disposal system in the ground:

FIG. 5 is a perspective view showing the foldable support leg assembly of the present invention employed for supporting a traffic warning signal; and FIG. 6 is a perspective view showing the rear of the assembly as viewed in FIG. 5;

FIG. 7 is a side elevational view of the foldable support leg assembly in the stored position.

DESCRIPTION OF THE PREFERRED EMBODIMENT

Referring to the drawings and more particularly to FIGS. 1, 2 and 3, the foldable support leg assembly 1 of the present invention comprises a pair of bent, plastic, tubular legs 2 and 3 positioned in spaced, back-to-back relationship at their bent portions 4 and 5, to thereby form a hyperbolic configuration having a pair of upwardly extending divergent tubular arm portions 6 and 7, and a pair of downwardly extending divergent leg portions 8 and 9.

A fastener 10 fixedly connects the tubular legs 2 and 3 in spaced relationship at their bent portions 4 and 5. The fastener 10 comprises a tubular spacer 11 positioned in the space between the tubular leg bent portions 4 and 5, and a bolt 12 extending through the tubular leg 2, the spacer 11 and the tubular leg 3 and secured therein by a nut 13.

A third depending tubular leg portion 14 is positioned in the space between the pair of downwardly extending divergent leg portions 8 and 9 and has its upper end portion pivotally connected to the divergent leg portions 8 and 9 by a pin 15. The upper end portion of the pivotal leg 14 is provided with an inclined surface 16 having a lower end portion 17 engaging one side of the spacer 11 when the leg 14 is pivoted outwardly to the erected position, as shown in FIG. 3. The upper end portion 18 of the inclined surface engages the opposite side of the spacer 11 when the leg 14 is pivoted to the stored position. By this construction and arrangement, the lower and upper end portions 17 and 18 of the inclined surface 16 cooperate with the spacer 11 to provide stops for the pivotal movement of the leg 14 between the stored and erected positions.

To complete the structure of the foldable support leg assembly, the lower end portions of the tubular legs 3 and 14 are provided with vinyl caps 19 for frictionally supporting the erected support leg assembly 1 on the ground, as shown in FIGS. 4, 5 and 6. The upper end portions of the tubular legs 2 and 3 are similarly provided with vinyl caps 20 for frictionally holding an inclined trough 21 containing a flexible drain hose 22 employed for conveying waste materials from a recreational vehicle 23 to an underground waste or sewerage system 24.

The desired slope or inclination for the drain hose 22 can be obtained by employing either one trough 21 or another trough section 25 in telescopic relationship with the first trough section 21 and having one end engaging the ground. By positioning the foldable leg assembly 1 axially along the troughs 21 and 25 in a direction toward the underground waste system 24, a greater inclination will be imparted to the troughs 21 and 25 and associated hose 22.

The versatility of the foldable leg assembly 1 of the present invention is illustrated in FIGS. 5 and 6, wherein the assembly is shown for supporting a conventional triangular traffic marker 26.

From the above description, it will be readily apparent to those skilled in the art that the foldable support leg assembly 1 of the present invention by its construction and arrangement will occupy a minimal space when folded to the stored position. When used to support a recreational vehicle drain hose 22 contained within a trough 21 having one end engaging the ground, the desired slope of the drain hose 22 can be obtained by positioning the support leg assembly 1 at varying distances relative to the ground engaging end of the trough 21 to thereby vary the inclination of the trough 21 and thus the slope of the drain hose 22.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A foldable support leg assembly comprising, a pair of bent legs aligned in spaced, back-to-back relationship at their bent portions, to thereby form a hyperbolic configuration having a pair of upwardly divergent arm portions and a pair of downwardly extending divergent leg portions, a spacer positioned in the space between the leg bent portions, fastener means fixedly connecting said spacer to said pair of bent legs, a third depending leg positioned in the space between the pair of downwardly extending divergent leg portions, means pivotally connecting the upper end portion of the third depending leg to the divergent leg portions, whereby the depending third leg is pivotal from a stored position in a plane coextensive with the pair of downwardly extending divergent leg portions, to an erected position wherein the depending third leg extends outwardly from said plane at an inclined position, and an inclined surface on the upper end portion of the third leg, said inclined surface having a lower end portion and an upper end portion, the lower end portion of the inclined surface engaging one side of said spacer when the third leg is pivoted outwardly to the erected position, the upper end portion of the inclined surface engaging the opposite side of the spacer when the depending third leg is pivoted inwardly to the stored position, whereby the lower and upper end portions of the inclined surface cooperate with the spacer to provide stops to limit the pivotal movement of the third depending leg between the stored and erected positions.

2. A foldable support leg assembly according to claim 1, wherein the pair of bent legs and third leg are plastic tubes.

3. A foldable support leg assembly according to claim 2, wherein vinyl caps are mounted on the ends of the upwardly divergent arm portions and downwardly divergent leg portions.

4. A foldable support leg assembly according to claim 1, wherein the spacer is tubular and the fastener means comprises, a bolt extending through the bent portions of the legs and the tubular spacer, and a nut secured to the end of the bolt.

5. A foldable support leg assembly according to claim 4, wherein the means pivotally connecting the upper end portion of the third depending leg to the divergent leg portions comprises a pin extending through the third depending leg and the divergent leg portions.

6. A foldable support leg assembly according to claim 1, wherein a waste material flexible drain hose assembly is positioned between and supported by the pair of upwardly divergent arm portions, the pair of downwardly extending divergent leg portions and third depending leg being supported by the ground, one end of the flexible drain hose assembly being connected to a recreational vehicle and the opposite end of the flexible drain hose assembly being connected to an underground sewerage system.

7. A foldable support leg assembly according to claim 6, wherein the flexible drain hose assembly comprises inclined trough means having one end portion engaging the ground and the opposite end portion supported by the pair of upwardly divergent arm portions, and a flexible drain hose supported by said trough means, whereby a desired slope can be imparted to the drain hose by positioning the support leg assembly at varying distances relative to the ground engaging end of the trough means, to thereby vary the inclination of the trough means.

8. A foldable support leg assembly according to claim 7, wherein the trough means comprises a pair of telescopically connected troughs.

9. A foldable support leg assembly according to claim 7, wherein the pair of bent legs and third leg are plastic tubes, vinyl caps mounted on the ends of the upwardly divergent arm portions and downwardly divergent leg portions, the vinyl caps on the ends of the upwardly divergent arm portions frictionally supporting the trough means.

10. A foldable support leg assembly according to claim 1, wherein a traffic marker is connected to the pair of bent legs.

* * * * *